United States Patent [19]

Baatz et al.

[11] 4,193,889

[45] Mar. 18, 1980

[54] MICROENCAPSULATION WITH MODIFIED ALIPHATIC POLYISOCYANATES

[75] Inventors: Gunther Baatz; Walter Schäfer, both of Cologne; Manfred Dahm, Leverkusen, all of Fed. Rep. of Germany

[73] Assignee: Bayer Aktiengesellschaft, Fed. Rep. of Germany

[21] Appl. No.: 855,743

[22] Filed: Nov. 29, 1977

[30] Foreign Application Priority Data

Dec. 4, 1976 [DE] Fed. Rep. of Germany ....... 2655048

[51] Int. Cl.$^2$ ............................................. B01J 13/02
[52] U.S. Cl. ......................................... 252/316; 8/79; 252/8.1; 260/453 AB; 424/32; 428/307; 428/914
[58] Field of Search .......................... 252/316; 424/32; 260/453 AB

[56] References Cited

U.S. PATENT DOCUMENTS

| | | | |
|---|---|---|---|
| 3,723,372 | 3/1973 | Wakimoto et al. | 260/29.1 R |
| 3,796,669 | 3/1974 | Kiritani et al. | 252/316 |
| 3,903,127 | 9/1975 | Wagner et al. | 260/453 AB |

*Primary Examiner*—Richard D. Lovering
*Attorney, Agent, or Firm*—Connolly and Hutz

[57] ABSTRACT

Microcapsules and a process for the production of these microcapsules the walls of which consist of polycondensates of a film-forming aliphatic polyisocyanate containing at least one biuret group or polyaddition products thereof with a chain-extending agent.

8 Claims, No Drawings

MICROENCAPSULATION WITH MODIFIED ALIPHATIC POLYISOCYANATES

The invention relates to microcapsules of which the outer shell is the reaction product of a film-forming modified aliphatic polyisocyanate with a chain-extending agent, and to their production.

The microencapsulation of organic and inorganic substances is basically known. This technique is reported, for example, in "Microencapsulation, Processes and Applications" by J. E. Vandegaer, Plenum Press, New York, London, (1974). One microencapsulation process uses interfacial polyaddition, wherein two components capable of reacting with one another by polyaddition, are mixed in different liquids immiscible with each other, and the polyaddition polymer is formed at the phase interface (cf. U.S. Pat. Nos. 3,575,882; 3,577,515 and 3,607,776).

In a practical embodiment initially a stable emulsion is prepared of which the disperse phase consists of the material to be encapsulated and the first component, optionally dissolved or emulsified in an additional solvent, and of which the continuous phase is formed by a liquid immiscible with the disperse phase. Emulsification aids, generally, have to be used for this purpose. The second reaction component soluble in the continuous phase is added to this emulsion. Shells of the polymer formed by polyaddition or polycondensation are then formed around the disperse particles of the material to be encapsulated over a prolonged period (sometimes amounting to several hours). Suitable component pairings for this process are, for example, diisocyanates/diols, diisocyanates/diamines, dicarboxylic acid chlorides/diamines, disulphonyl chlorides/diamines or phosgene/diamines.

Encapsulation processes of this type have some decisive disadvantages. Thus, it is necessary to prepare a stable emulsion which does not disintegrate, even when the second component is added. The process cannot be varied to any significant extent because only few suitable reaction components are available. For practical application, only few and very similar polymers can be produced in the manner described. Furthermore, the low molecular weight reaction components are substantially non-film-forming. Accordingly, only little core material can be encapsulated in a large quantity of shell-forming material.

In order to overcome these disadvantages and to utilise film-forming properties, an attempt was made (cf. German Pat. No. 2,311,712) to replace the non-film-forming polyisocyanates by their terminal NCO-group-containing reaction products with diols and polyols having molecular weights in the range of from 400 to 10,000 (hereinafter also referred to as "NCO-prepolymers"). These NCO-prepolymers can be modified in their molecular structure so that they become self-emulsifying and retain their film-forming properties. Although this simplifies making of a stable emulsion, serious disadvantages also arise. For example, the crosslinking density in the finished shells of the microcapsules decreases. The crosslinking density can be increased again by using short-chain low molecular weight NCO-prepolymers, but then the film-forming capacity is considerably reduced or disappears altogether. The film-forming capacity disappears totally when the molecular weights of the diols or polyols used for forming the NCO-prepolymers are below 400.

Another disadvantage of the NCO-prepolymers arises out of their content of free monomeric diisocyanates or polyisocyanates which can interfere with the polyaddition reaction, as they are highly reactive and difficult to emulsify. Their volatility necessitates precautions during their handling. Capsule walls made from NCO-prepolymers have a distinctly higher permeability, especially, to readily volatile core materials, such as chloroform, perchloroethylene or butyl acetate.

The present invention provides microcapsules having walls of reaction products of a film-forming aliphatic polyisocyanate containing at least one biuret group with a chain-extending agent.

The invention also provides a process for producing microcapsules, wherein a film-forming aliphatic polyisocyanate containing biuret groups or a solution thereof in an inert solvent is dissolved or emulsified in the material to be encapsulated, the resulting solution or emulsion is dispersed in water, an NCO-reactive chain-extending agent is added, the reaction mixture obtained is agitated until the microcapsules are formed.

"Film-forming aliphatic polyisocyanates containing at least one biuret group" are products which are formed from low molecular weight aliphatic diisocyanates by reactions on the isocyanate groups to form biuret groups. In the polyisocyanates used in accordance with the invention, some of the isocyanate groups can also be modified by dimerisation or trimerisation or by conversion into carbodiimide groups, and a part is converted into biuret groups, for example, by reaction with water, tertiary butanol, formic acid or amines. Aliphatic polyisocyanates modified in this way usually have viscosities of from 8,000 to 40,000 centipoises at 25° C.

Reactants for these modified polyisocyanates during the microencapsulation process are low molecular weight chain-extending agents, such as water, diols or polyols, but especially amines.

The microcapsules according to the invention show adequate crosslinking density and, therefore, are only slightly permeable to easily volatile encapsulated substances.

The process of the invention has decisive advantages. The reaction of the modified isocyanates with the reactants is quick enough for continuous operation. High volume/time yields are obtained. The polyisocyanates used in the invention have a good film-forming capacity and yield high crosslinking density. By suitably selecting the reactivity and functionality of the reactants, the degree of crosslinking can be controlled during the wall-forming reaction. By suitably selecting the chemical composition of the reactants, the properties of the membranes formed are modified within limits, e.g., improved toughness of the shell material and adequate crosslinking without greatly increasing the permeability to a given core material can be achieved. Impermeability to a given core material depends in a complex manner on physical and chemical factors; besides nature and structure of the capsule membranes, other outside factors play an important part.

The variability within the classes of substances to be used both in regard to their chemical structure and also in regard to the way in which the reaction is carried out (for example, in regard to the degree of crosslinking), is a remarkable advantage of the invention. Surprisingly, it is even possible to produce impermeable capsule membranes for halogenated volatile hydrocarbons such as chloroform and perchloroethylene. The shell polymers are stable to light so that the capsules do not yellow.

By virtue of their substantial involatility, the modified polyisocyanates containing biuret groups are easy to handle and can be indefinitely stored providing reactive components are kept away.

For carrying out the process according to the invention, which is an encapsulation process by polyreaction at the organic phase interface in a dispersion, the wall-forming polyisocyanate can be dissolved or emulsified in the core material either as such or in the form of a solution in an inert solvent or solvent mixture. In a shear gradient which is perferably produced by intensive mixing with small mixers or mixing machines, the organic phase can be dispersed in a phase which is immiscible with it, for example, water, and which contains an isocyanate-reactive polyamine or a catalytically active tertiary amine or similarly active compounds.

The amine can also be added subsequently.

Preferred polyisocyanates containing at least one biuret group are those based on hexamethylene-1,6-diisocyanates, m-xylylene diisocyanate, 4,4'-diisocyanatodicyclohexyl methane and isophorone diisocyanate which contain at least two functional isocyanate groups per molecule.

Particularly suitable compounds are polyisocyanates, particularly based on derivatives of hexamethylene-1,6-diisocyanate with a biuret structure of which the production is described in German Offenlegungsschrifts Nos. 1,568,017 and 1,931,055.

They form excellent films by reaction with low molecular weight chain-extenders such as, e.g., water, diols or diamines.

Instead of or in addition to the isocyanate groups, carbodiimide, uretdione, uretone imine, uretidine dione diimine, oxadiazine trione, 4-imino-oxazolidinone-(2)-,$\beta$-alkylene propiolactone and cyclobutane dione-(1,3)-groups can also be present as reactive groups.

Thus, it is possible to use, for example, polyisocyanatopolyuretonimines of the type formed by subjecting hexamethylene-1,6-diisocyanate containing biuret groups to carbodiimide formation in the presence of organophosphorus catalysts and by the further reaction of initially formed carbodiimide groups with isocyanate groups to form urethone imine groups. Furthermore, these isocyanates can be used in admixture with one another and with other aliphatic and aromatic isocyanates.

Depending upon the reaction conditions, the resulting modified polyisocyanate may contain considerable proportions of oxadiazine trione, triisocyanurate and sym. triazine dione imine as structural elements. Products such as these are also suitable for use as shell-formers.

Organophosphorus catalysts for carbodiimide-forming reactions are described, for example, in U.S. Pat. Nos. 2,663,736; 2,663,737; 2,663,738 and 2,663,739.

Before they are used for microencapsulation, the polyisocyanates used in accordance with the invention can be additionally modified by reaction with difunctional and trifunctional chain extenders, for example water, polyfunctional alcohols such as ethane diol, glycerol or trimethylol propane or carboxylic acids such as succinic acid, adipic acid, sebacic acid, in proportions of from 0.01 to 0.5 mole per isocyanate equivalent. Encapsulation by means of isocyanate-reactive amines as chain-extenders is preferred to the use of catalytically active compounds because the capsule shells formed in this way are generally more highly crosslinked and more impermeable than those obtained by catalytically accelerating the reaction of isocyanate groups. However, since catalytically active compounds are used in considerably smaller quantities than reactive amines (generally in quantities of from 0.1 to 0.5% by weight, based on dispersant), their use also affords advantages such as, for example, little undesirable amine salt in the neutralised capsule slurries after encapsulation.

Examples of chain-extending polyamines reactive to isocyanate groups are hydrazine, hydrazine-2-ethanol, 1,2-ethylene diamine, bis-(3-aminopropyl)-amine, bis-(2-methylaminoethyl)-methylamine, 1,4-diaminobenzene, 4,4'-diaminodiphenyl methane, 1,4-diaminocyclohexane, 1-aminomethyl-5-amino-1,3,3-trimethyl cyclohexane 3-amino-1-methylaminopropane, N-hydroxyethylethylene diamine, N-methyl-bis-(3-aminopropyl)-amine, 1-aminoethyl-1,2-ethylene diamine, bis-(N,N'-aminoethyl)-1,2-ethylene diamine, 1,4-diamine-n-butane, 1,6-diamino-n-hexane and 1,2-ethylene diamine-N-ethane sulphonic acid (as alkali metal salt).

Catalytically active tertiary amines or similarly acting compounds suitable for the production of the microcapsules are any compounds of the type known as catalysts for isocyanate reactions.

Examples are triethylamine, N-methyl morpholine, N-ethyl morpholine, N-methyl-N'-dimethylaminoethyl piperazine, N,N,N',N'-tetramethyl ethylene diamine, bis-(dimethylaminoethyl)-ether, 1,4-diazabicyclo-(2,2,2)-octane, 1,2-dimethylimidazole, 2-methyl imidazole, N-diethyl ethanolamine; sila-amines with carbon-silicon bonds (for example according to German Pat. No. 1,229,290), preferably 2,2,4-trimethyl-2-silamorpholine and mixtures of these catalysts. Similarly acting compounds are those of the type which catalyse trimerisation of the isocyanate groups such as, for example, 2,4,6-tris-(dimethylaminomethyl)-phenol, alkoxides, alkali metal formates, carbonates and borohydrides (cf. also British Pat. No. 837,120 and H. Ulrich "Cycloaddition Reactions of Heterocumulenes", Academic Press, New York, 1967).

Organophilic substances immiscible with water or aqueous solutions can be encapsulated in accordance with the invention. The core materials to be encapsulated must be inert with respect to isocyanate groups. The wall-forming modified polyisocyanate must be miscible therewith or at least readily emulsifiable therein. However, it can also be added in solution to the core material. In many cases, this can also be achieved by adding a solution promoter or a solvent mixture boiling below 80° C. which can be evaporated off during the wall-forming polyreaction.

Examples of suitable core materials are aliphatic and aromatic hydrocarbons and chlorinated hydrocarbons, colour former solutions for carbonless copying-papers, such as crystal violet lactone and N-benzoyl leucomethylene blue in aromatic solvents, aliphatic and araliphatic esters and ethers, perfume oils, pesticides based on thiophosphoric acid esters and flameproofing agents based on organic phosphorus and chlorine or bromine compounds.

To carry out the process according to the invention, the polyisocyanate is dissolved or emulsified in the core material to be encapsulated or is added to the organic phase in the form of a solution miscible therewith as described above.

If the polyisocyanate can readily be emulsified in the core material, the emulsion can be directly used for encapsulation.

In a shear gradient, which is preferably produced by intensive mixing with small mixers or mixing machines, the organic phase is introduced into a liquid phase which is immiscible with it, for example water, and which contains an isocyanate-reactive diamine or triamine or a catalytically active component. The amine can also be added to the aqueous phase immediately after dispersion.

In order to obtain better emulsification and stabilisation of the dispersion, emulsification aids are preferably added to the aqueous phase. Examples are protective colloids such as polyvinyl alcohol, gelatin, carboxymethyl cellulose and polyacrylates.

Encapsulation can be carried out continuously or in batches. The degree of turbulence generated during mixture determines the diameters of the microcapsules obtained. The diameter of the microcapsules can be from about 5 to about 2,000 μm according to the mixing conditions. The ratio by weight of core material to shell material in the finished microcapsules normally is from 60–90 to 40–10.

EXAMPLE 1

(a) Production of the isocyanate component (biuret polyisocyanate)

1,000 parts by weight of hexamethylene-1,6-diisocyanate (5.952 mole) and 50 parts by weight of tert.-butyl alcohol (0.676 mole) are mixed at room temperature. The molar ratio corresponds to 8.8 moles of diisocyanate: 1 mole of tert.-butanol. The temperature of the reaction mixture is increased to 160° C. over a period of about 30 minutes. A vigorous evolution of carbon dioxide and isobutylene begins at that temperature.

The temperature is slowly increased to 185° C. over a period of another 30 minutes. After about 3 hours at 185° C., the evolution of gas and hence the reaction is over. The reaction product is then freed from monomeric hexamethylene diisocyanate in a thin-layer evaporator under a pressure of 0.2 Torr and at a temperature of 160° C. Approximately 284 parts by weight of a viscous biuret polyisocyanate are obtained. NCO-content: 21.3% by weight. The product has a viscosity of 10.500 cP at 20° C.

(b) Encapsulation 25 ml of trichloroethyl phosphate (TCAP) are mixed with 5 g of the biuret polyisocyanate described in (1a) by means of a laboratory disperser of the Ultra-Turrax type (manufactured by Jahnke and Kunkel AG).

300 ml of water containing 1 g of polyvinyl alcohol in solution (Moviol 50/98, a product of Hoechst AG) are initially introduced and the mixture of TCAP and biuret polyisocyanate is emulsified therein immediately after its preparation by means of a laboratory stirrer of the Lenart-Rapid type (500 rpm). After about 1 minute, a solution of 14 g of ethylene diamine in 56 g of water is added to the emulsion. The mixture is then heated to 60° C. and stirred for approximately 1 hour under the same conditions to harden the capsules and is then neutralised. The diameter of the capsules produced amounts to between 300 and 1200 μm.

EXAMPLE 2

3 g of the biuret polyisocyanate described in (1a) are dissolved in 25 g of the thiophosphoric acid triester marketed by Bayer AG under the name Volaton (85% solution in n-butanol). The solution is emulsified in 300 ml of water containing 1 g of polyvinyl alcohol (Moviol 50/98, a product of Hoechst AG).

A Kotthoff mixing siren of the MS1-CAA11G type is used for emulsification (1 minute at 4500 rpm). About 40 seconds after the organic phase has been added, a solution of 3 g of hydrazine hydrate in 67 g of water is added to the resulting emulsion and, after emulsification for 1 minute, the mixing siren is replaced by a laboratory stirrer of the Lenart-Rapid type (500 rpm).

To harden the microcapsules formed, the resulting capsule dispersion is allowed to after-react for about 1 hour at 60° C. under the same stirring conditions. The batch is then neutralised with semi-concentrated acetic acid. The diameter of the microcapsules amounts to between 20 and 30 μm.

EXAMPLE 3

5 g of the biuret polyisocyanate described in (1a) are dissolved in 25 g of phthalic acid di-n-butyl ester. The solution is emulsified in 300 ml of water containing 1.5 g of Moviol 50/98. A Kotthoff mixing siren is used for emulsification (1 minute at 8900 rpm).

During the emulsification process, a solution of 27 g of 1-aminoethyl-1,2-ethylene diamine (diethylene triamine) in 43 g of water is added to the batch. For after-reaction, the resulting capsule dispersion is stirred for about 1 hour at 60° C. with a laboratory stirrer of the Lenart-Rapid type (500 rpm).

The microcapsules formed have a diameter in the range of from 1 to 20 μm.

The capsule dispersion is neutralised or freed from excess amine by centrifuging with a laboratory centrifuge (for about 10 to 20 minutes at 2000 rpm) and decanting off the aqueous phase.

EXAMPLE 4

1 g of crystal violet lactone (colouring component in carbonless copying-papers) is dissolved in 25 g of solvent naphtha (a mixture of aromatic hydrocarbons produced by BV Aral). 5 g of the biuret polyisocyanate described in (1a) are added to and mixed with this solution by means of a laboratory disperser of the Ultra-Turrax type (manufactured by Jahnke and Kunkel AG).

300 ml of water containing 1.5 g of Moviol 50/98 are initially introduced and the mixture of core material and wall-forming biuret polyisocyanate is emulsified therein immediately after its preparation. Emulsification is carried out in the same way as described in Example 3.

During the emulsification process, a solution of 56 g of pentaethylene hexamine in 64 g of water is added to the batch about 40 seconds after addition of the organic phase.

After running for about 1 minute, the mixing siren used for emulsification is replaced by a laboratory stirrer of the Lenart-Rapid type (500 rpm) and the microcapsule dispersion is stirred for 1 hour at 60° C. The microcapsules formed have diameters in the range of from 4 to 30 μm.

EXAMPLE 5

(a) Production of the isocyanate component (urethanised biuret polyisocyanate)

Following the procedure described in (1a), a biuret polyisocyanate with the following data is prepared by increasing the proportion of hexamethylene-1,6- diisocyanate to a reactant ratio of 11 moles of hexamethylene-1,6-diisocyanate to 1 mole of tert.-butyl alcohol:

viscosity at 20° C.: 2800 cP, NCO-content: 23.3% by weight.

Corresponding to an average molecular weight of the reaction product of approximately 670, this per "mole" biuret polyisocyanate may be modified by chain extension with 0.05 mole of glycerol. This reaction product has the following data:

viscosity at 20° C.: 83 cP, NCO-content: 21.2% by weight.

(b) Encapsulation

For encapsulation, 300 ml of water containing 1 g of Moviol 50/98 in solution are initially introduced as the outer phase. 25 g of per-chloroethylene and 5 g of the polyisocyanate described in Example 5(a) are mixed by means of a laboratory disperser of the Ultra-Turrax type, in the same way as described in Example 4, and similarly further processed with the difference that 12 g of hydrazine hydrate in 58 g of water are added as amine during emulsification of the outer phase.

After 1 hour's after-reaction at 60° C. (laboratory stirrer, Lenart-Rapid type rotating at 500 rpm), microcapsules with diameters in the range of from 5 to 35 μm are obtained.

EXAMPLE 6

5 g of the biuret polyisocyanate described in Example 1(a) are dissolved in 25 g of phthalic acid di-n-butyl ester. The solution is emulsified in 300 ml of water containing 1.5 g of Moviol 50/98. A Kotthoff mixing siren is used for emulsification (1 minute at 8900 rpm).

At the beginning of the emulsification process, a solution of 0.5 g of N-methyl-N'-dimethylaminoethyl piperazine in 70 g of water is added to the aqueous phase. After about 1 minute, the mixing siren is replaced by a laboratory stirrer of the Lenart-Rapid type by which the batch is stirred for 1 hour at 500 rpm with an increase in temperature to 60° C. The resulting microcapsules have diameters in the range of from 4 to 16 μm.

We claim:

1. Microcapsules having walls which comprise a polycondensate of a film-forming aliphatic polyisocyanate containing at least one biuret group or a polyaddition product thereof with a chain-extending agent selected from the group consisting of water, a polyol and a polyamine.

2. Microcapsules as claimed in claim 1, wherein the polyisocyanate is a biuret group-containing reaction product of hexamethylene-1,6-diisocyanate with water, tertiary butanol, formic acid or an amine.

3. Microcapsules as claimed in claim 1, wherein polycondensation is produced by a tertiary amine or a basically acting compound.

4. A process for the production of microcapsules, wherein a film-forming aliphatic polyisocyanate containing biuret groups, or a solution thereof in an inert solvent, is dissolved or dispersed in materials to be encapsulated, the resulting solution or dispersion is emulsified in water, a tertiary amine initiating the polycondensation reaction or a basically acting compound or an NCO-reactive chain-extending agent is added, the reaction mixture obtained is admixed until the microcapsules are formed, and the microcapsules are isolated.

5. A process as claimed in claim 4, wherein the polyisocyanate containing biuret groups is a reaction product of hexamethylene-1,6-diisocyanate with water, tertiary butanol, formic acid or an amine.

6. A process as claimed in claim 4, wherein the chain-extending agent is water, a diol or polyol or a polyamine.

7. A process as claimed in claim 4, wherein the catalytically active compound is a tertiary amine or a basically acting compound.

8. Microcapsules produced by a process as claimed in claim 4.

* * * * *

REEXAMINATION CERTIFICATE (1567th)
United States Patent [19]
Baatz et al.

[11] B1 4,193,889
[45] Certificate Issued  Oct. 15, 1991

[54] MICROENCAPSULATION WITH MODIFIED ALIPHATIC POLYISOCYANATES

[75] Inventors: Gunther Baatz; Walter Schäfer, both of Cologne; Manfred Dahm, Leverkusen, all of Fed. Rep. of Germany

[73] Assignee: Bayer Aktiengesellschaft, Leverkusen, Fed. Rep. of Germany

Reexamination Request:
No. 90/002,044, Jun. 6, 1990

Reexamination Certificate for:
Patent No.: 4,193,889
Issued: Mar. 18, 1980
Appl. No.: 855,743
Filed: Nov. 29, 1977

[30] Foreign Application Priority Data
Dec. 4, 1976 [DE] Fed. Rep. of Germany ....... 2655048

[51] Int. Cl.$^5$ .................. A01N 25/34; A61K 7/46; B01J 13/16
[52] U.S. Cl. .................. 428/402.21; 8/526; 252/601; 264/4.7; 424/408; 424/492; 424/494; 424/497; 428/402.24; 428/914; 512/4
[58] Field of Search .............. 264/4.7; 428/402.21, 428/914, 402.24; 8/526; 252/601; 424/408, 492, 494, 497; 512/4

[56] References Cited
U.S. PATENT DOCUMENTS
3,886,085  5/1975  Kiritani et al. .................. 264/4.7

FOREIGN PATENT DOCUMENTS
42-771  1/1967  Japan .

OTHER PUBLICATIONS

P. Kurtz, Chimie et Industrie 88, p. 225, last para & p. 226, first para (1962).
H. Wagner, H. F. Sarx, Lackkunstharze, Carl Hanser Verlag, Munchen, pp. 162–163 (1971).
Desmodur N dated Jul. 1, 1971 and Desmodur N Feb. 1, 1966.

*Primary Examiner*—Richard D. Lovering

[57] ABSTRACT

Microcapsules and a process for the production of these microcapsules the walls of which consist of polycondensates of a film-forming aliphatic polyisocyanate containing at least one biuret group or polyaddition products thereof with a chain-extending agent.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claims 1 and 4 are determined to be patentable as amended.

Claims 2, 3 and 5–7, are determined to be patentable.

New claims 9–12 are added and determined to be patentable.

1. Microcapsules having walls which comprise a polycondensate of a film-forming aliphatic polyisocyante containing at least one biuret group or a polyaddition product thereof with a chain-extending agent selected from the group consisting of water, a polyol and a polyamine *and containing an encapsulated material, said microcapsules being produced by dissolving or dispersing a solvent-free film-forming aliphatic polyisocyanate containing biuret groups in materials to be encapsulated, emulsifying the resulting solution or dispersion in water, adding a tertiary amine or a basically acting compound or an NCO-reactive chain-extending agent to initiate the polycondensation, and admixing the reaction mixture obtained until the G37 microcapsules are formed.*

4. A process for the production of microcapsules, wherein a *solvent-free* film-forming aliphatic polyisocyanate containing biuret groups[, or a solution thereof in an inert solvent,] is dissolved or dispersed in materials to be encapsulated, the resulting solution or dispersion is emulsified in water, a tertiary amine initiating the polycondensation reaction or a basically acting compound or an NCO-reactive chain-extending agent is added, and the reaction mixture obtained is admixed until the microcapsules are formed.

*9. Microcapsules as claimed in claim 1, wherein polycondensation is produced by a polyamine.*

*10. Microcapsules as claimed in claim 1, wherein the encapsulated material are colour former solutions, perfume oils, pesticides or flameproofing agents.*

*11. Microcapsules as claimed in claim 1, wherein prior to forming the microcapsule walls the film-forming aliphatic polyisocyanate is subjected to thin layer evaporation at a pressure of 0.2 Torr and at a temperature of 160° C.*

*12. A process as claimed in claim 4, wherein prior to the production of the microcapsules, the film-forming aliphatic polyisocyante is subjected to thin layer evaporation at a pressure of 0.2 Torr and at a temperature of 160° C.*

* * * * *